Figure 2:
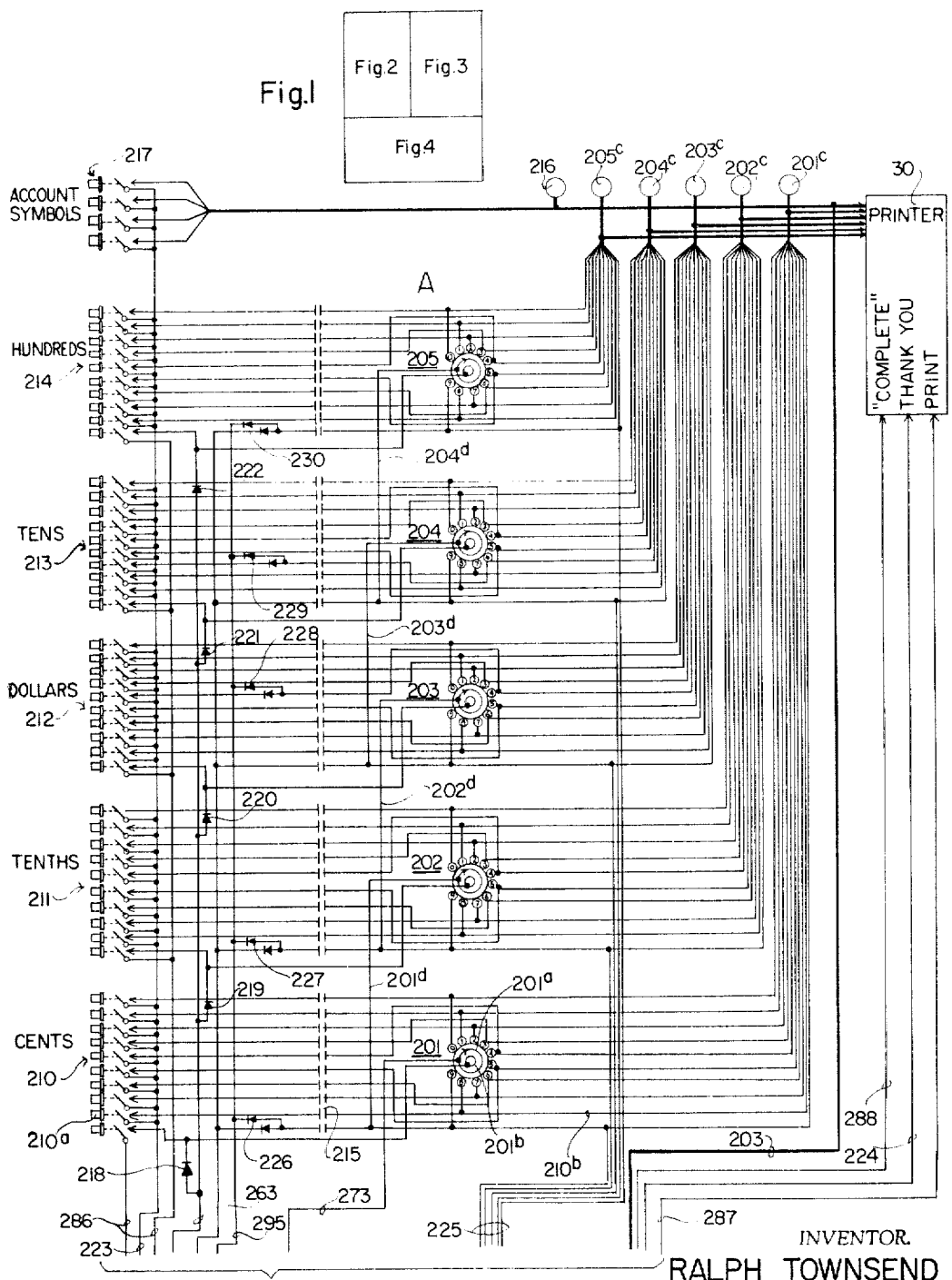

INVENTOR.
RALPH TOWNSEND

Oct. 25, 1966 R. TOWNSEND 3,281,794
CASH REGISTER SYSTEM
Filed Dec. 21, 1962 3 Sheets-Sheet 3

INVENTOR.
RALPH TOWNSEND
BY
Alexander & Dowell
ATTORNEYS

United States Patent Office 3,281,794
Patented Oct. 25, 1966

3,281,794
CASH REGISTER SYSTEM
Ralph Townsend, Darien, Conn., assignor to American Machine & Foundry Company, a corporation of New Jersey
Filed Dec. 21, 1962, Ser. No. 246,516
24 Claims. (Cl. 340—172.5)

This invention relates to electronic registers, and particularly to electronic number storage and calculating means of the cash register type, which registers perform both addition and subtraction functions and also compute tax and change due.

It is an object of this invention to provide a new and improved electronic cash register system which performs all of its functions employing solid-state semiconductor circuits, and in which the only mechanical moving parts are the keyboard parts of the register and the mechanical printout means.

The prior art contains other types of electronic calculators, such as shown in Williams Patent 2,528,100, which have very considerable advantages over and are able to perform all of the functions which can be performed by mechanical calculators making such electronic registers particularly useful in supermarkets, cafeterias, and other places having a high turnover rate.

In addition, these electronic calculators have very considerable advantages by way of flexibility of design because that a wide variety of machines of varying degrees of complexity can be assembled, using electrically interconnected modular components, rather than with mechanical likages as in the case of mechanical registers. These modular electronic units include tax computing circuits in the form of printed circuit boards which are very easily changed to accommodate different tax structures in different jurisdictions or changes of tax rates within the same jurisdiction. Moreover, these electronic registers adapt themselves very easily to preset item keyboards connected with price setting means so a key representing a specific item will enter a preset price assigned to the corresponding item. The digital display systems associated with electronic equipment lend themselves specially to the well provision of plural remote indication units.

It is another object of the present invention to provide a cash register having a far longer life and lower wear than prior art mechanical registers employing multitudes of moving parts, and also a further object to provide an improved electronic register capable of performing substantially all of the register and calculating functions by solid-state semiconductor circuits having greater reliability than mechanical registers and electronic registers of the type shown in the prior art employing thermionic tubes in counters and switching circuits. The mechanical keyboard structure, in accordance with the present invention, can be given an uncommonly long life by using commercially available glass-enclosed reed switches operated by magnet means attached to the keys. The electronic calculator is quieter and smoother operating than prior art mechanical devices and operates so rapidly that the limiting factor involved in making an entry on the register is the time required for the operator manipulation. In addition, these keys are provided with an extremely light touch resembling that of an electric typewriter, and the entire circuit consumes a very minimal amount of power which can easily be operated from batteries in case of a power failure.

It is another object of this invention to provide a novel and improved electronic cash register employing a new system for transferring numbers from a keyboard into registers comprising solid-state decade counters having extremely high counting rate capabilities and high reliability, and for transferring numbers among these registers controlled by means of electronic ring counters, also employing solid-state semiconductor techniques, which program the functions of the register circuits by means of solid-state gates and flipflops, thereby again eliminating the necessity for mechanical switching means or relays. The selection of these counters as decade devices for each of the registers has the further advantage of eliminating any kind of coding or code translation which might be necessary in the event that a binary number system were used.

The present novel system for transferring numbers from one register to the other is embodied in an illustrative system including three separate registers in which the first of these registers is connected directly with the keyboard so that all entries are initially made into this register, and printout and indicators which receive data directly and exclusively from this input register so that switching of these devices from one register to another is avoided. It is the inherent great speed of the electronic register that permits transfer of the numbers back and forth between these registers so rapidly that it is easily possible for the same register to both receive the input and to read out the final output without appreciable delay. This input and output register, the aforementioned first register, receives numbers which are introduced from the keyboard as complements of the number 99999, therefore, a number which comprises all nines represents zero, or the initial condition of said first register. Consequently each number appears in the first register as 99999 minus the true number actually entered on the keyboard. This is the only one of the three registers which always receives entries as nines complements, and these nines complements are then transferred from one register to another so as to either add to or subtract from the numbers in the other registers depending on whether these numbers are true or complementary. A novel system of ring counters and gates is provided to furnish the control program by which orderly and logical transfer of numbers is accomplished. The wires leading from the keyboard switches are connected in reverse sequence to the digits of the first register which, because of this reverse sequence, receives all numbers in complementary form. Similarly, the printer, as well as any other output indicator units, are connected in reverse order to this same register so that the numbers which are read into the register and stored therein in complementary form, are read out therefrom in true form. This feature is believed to be novel in electronic calculators and serves to considerably reduce the complexity of the circuits, as will become apparent during the more detailed discussion of the circuits, illustrated by way of example in the drawings.

This novel means of transferring numbers from keyboard to register or from register to readout, can be illustrated by supposing that a number N has been entered into the first register directly from the keyboard and that this number, which is stored in the first register in complementary form, is then to be added to another number stored in the second register so as to provide a subtotal. By interconnecting these registers according to the present novel system, each register can comprise a straightforward decade counter in which all counting is done unidirectionally whether the system is adding or subtracting. Counting is accomplished by counting the number of pulses admitted to a register from a single input line thereto, this number of pulses being gated by external gate means. Each register is turned on and off by means of a flipflop which is controlled by the program ring counter, and gate means is provided for turning off each flipflop so as to end the counting. The output from the flipflop which controls the counter is used to gate pulses from a separate pulse oscillator which delivers pulses to a "highway" and thence to the input to one or more of the registers, depending on the condition of the flipflop. When the programmer turns on the flipflop, pulses are allowed to pass along the highway and into the register causing it to count. The first register starts with 99999 but is backed down toward zero when the number N is inserted into it. This number 99999 minus N is called the nines complement of the number N and can be derived by subtracting each digit in the number N from 9, for example, the nines complement of 23456 being 76543. The pressing of keyboard keys representing the number N sets into the first register the number 99999−N. Then to add this number to the second register, pulses are gated from a pulse oscillator into the first register until the count in that register is brought back up to 99999 while at the same time applying the same number of pulses to the second register. In this manner, starting with the nines complement of the number N in the first register and adding the same number of pulses to both the first and second register until the first register is brought back up to 99999, a number of pulses corresponding with the number N will have actually been added to the second register. When the first register reaches the number 99999, a gate is actuated to shut off the flow of pulses so that precisely N pulses have been added to the second register. By this process of counting a complement number in one register back up to 99999, transfer of numbers from register to register can be had while counting these registers always in the same increasing direction. In this same way, the indicators and printout means are connected to the ring counters of the complementary first register so that when the register reads 2, a 7 is actually printed. In this way, the print means always prints exactly what was entered via the keyboard although the true numbers entered on the keyboard pass through the nines complement condition in the first register before being printed in true form.

It is therefore an important object of this invention to provide a register system in which unidirectional counters may be used for each of the registers, and in which at least one of the registers employs the nines complement, so that this register is always an intermediate step between the keyboard and the other registers, or when transferring from a register to a printer or to another register. Unidiectional counters are simpler and less expensive than bidirectional counters and moreover the circuitry controlling these counters is somewhat simplified if the counters are always advanced in the same direction and need not be reversed. Also, in view of the fact that most entries into the first register will be items worth considerably less than $999.99, it thus follows that only a comparatively few pulses are required to count the first register back up to 99999 while transferring the contents thereof to the second register or to the third register, which comprises a tax register.

Figure 3:
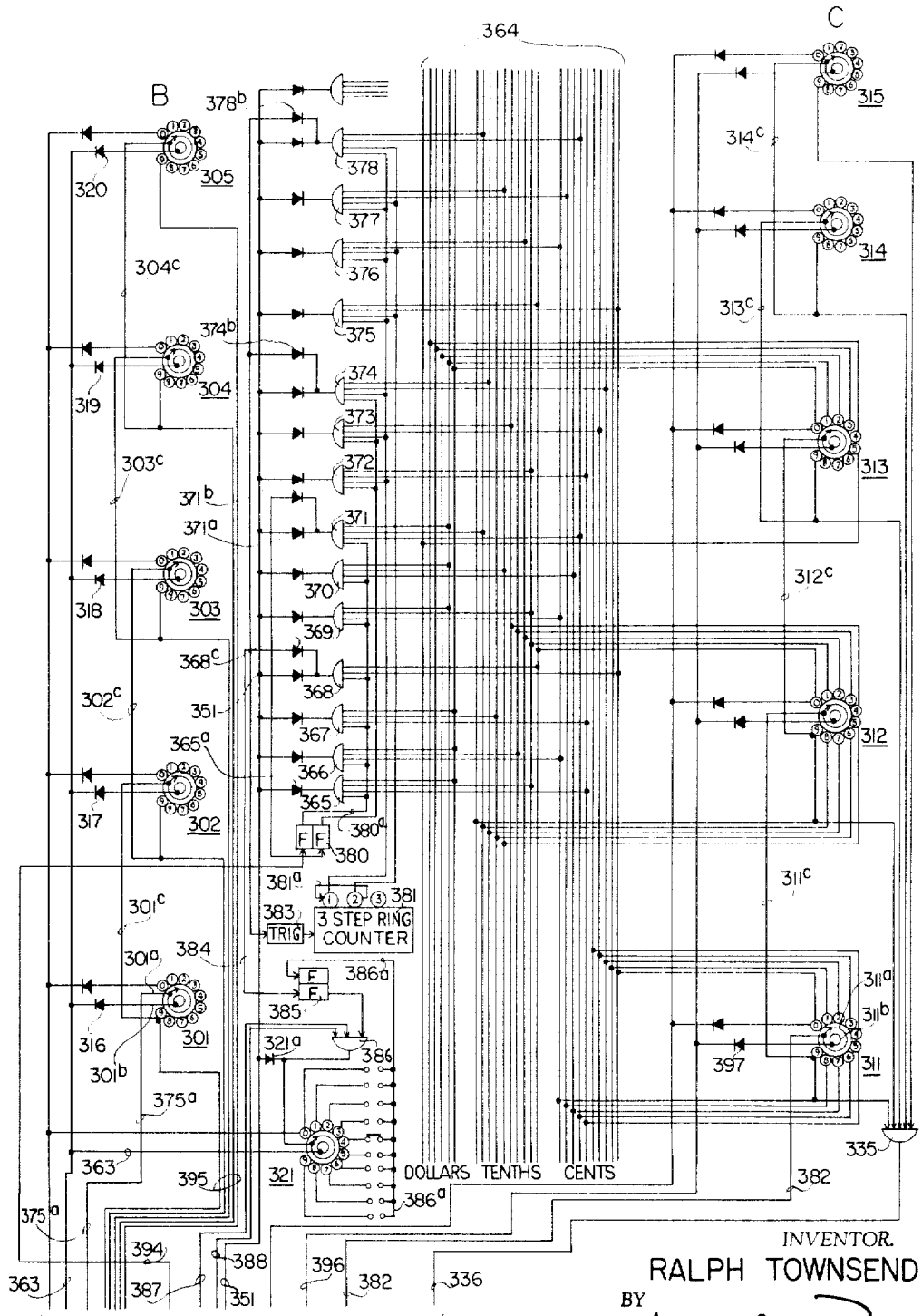
Figure 4:
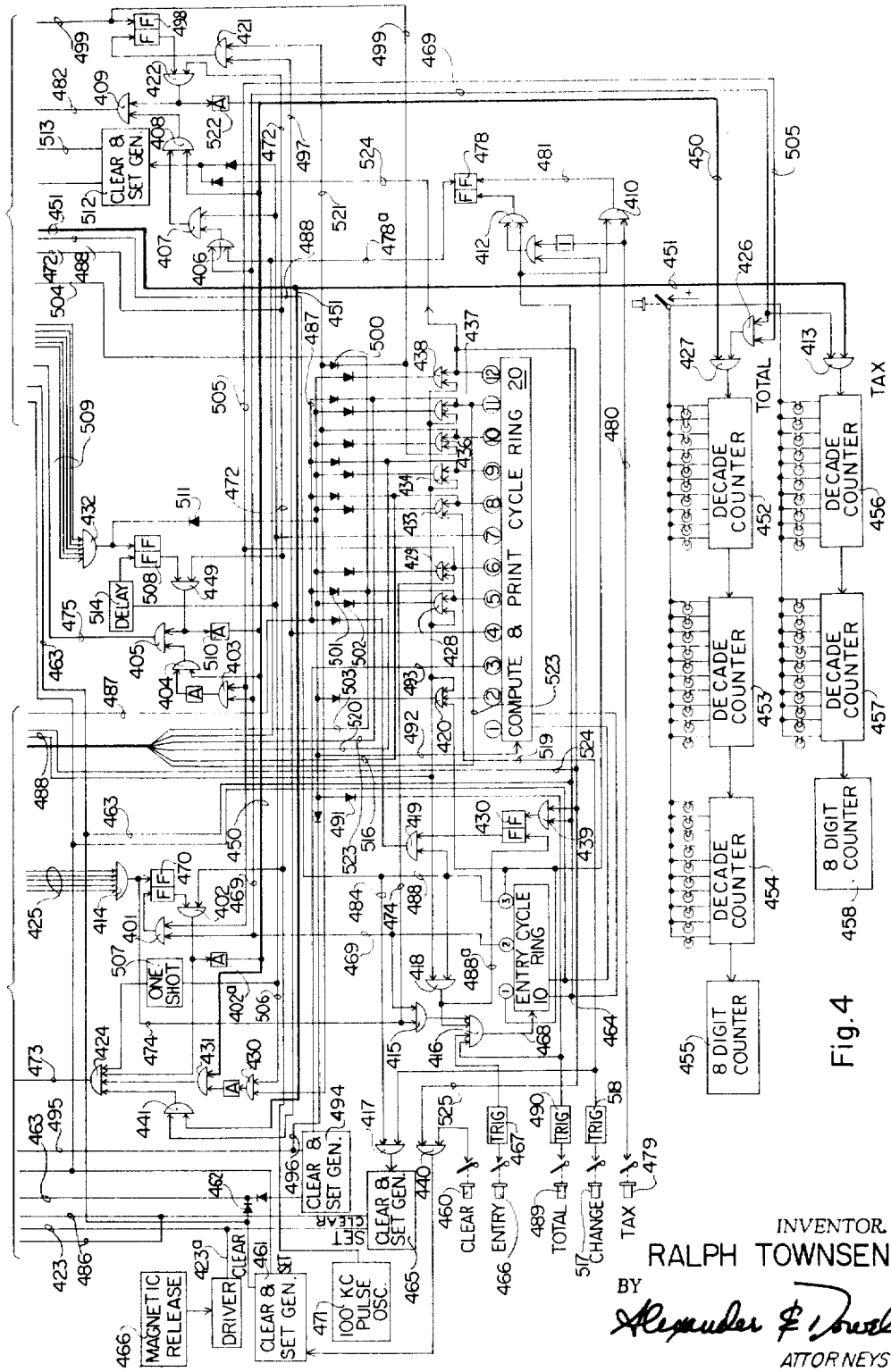

Other objects and advantages of this invention will become apparent during the following discussion of the drawings wherein:

FIG. 1 is a block diagram showing how FIGS. 2, 3 and 4 can be connected together in order to provide a unitary schematic diagram;

FIGS. 2, 3 and 4 comprise three interconnecting diagrams showing schematically the circuitry and functions of the calculator when they are mutually associated in the manner shown in FIG. 1.

A practical embodiment of the present invention, illustrated in FIGS. 2, 3 and 4, includes three registers A, B and C (FIGS. 2 and 3) the numbers or count in the system being transferred back and forth among these registers according to a program which is controlled by a system of gates and counters (FIG. 4). The program of the apparatus can be divided into two cycles which to a considerable extent are performed independently of each other. First there is an entry cycle which occurs each time a new number is entered into the system from a keyboard illustrated along the left edge of FIG. 2, and is controlled by an entry cycle ring counter 10 (FIG. 4) which controls the opening and closing of certain gates associated therewith and which is stepped through three different functions as will be described in detail hereinafter. It is the purpose of this entry cycle ring counter 10 to transfer the numbers which are entered on the keyboard into register A and also cause printer 30 (FIG. 4) to print the value of each number entered in this manner.

The other cycle of the system as mentioned above is the compute and print cycle which is controlled by the compute and print cycle ring counter 20 (FIG. 4) and its associated gates. This compute and print cycle is performed after the various amounts have been entered in the A register from the keyboard, which amounts comprise the items of a bill. This second cycle also computes the tax, prints the tax and a new subtotal including the tax, and then computes and prints the change due the customer after the amount of cash tendered has been entered in the machine. Some of these functions follow each other automatically according to the illustrated embodiment, whereas others of the functions are initiated by the pressing of certain control keys located at the left end of FIG. 4.

The registers A, B and C illustrated in the present embodiment include five digits each, and each of these digits is represented by a decimal counter, preferably a solid-state counter of which there are a number of examples in the prior art. Each of these counters in the registers A, B and C is represented by a symbol showing ten counter positions, zero through 9, so labeled on the drawings outside of two coaxial circles.

The register A, as stated above, comprises five of these counters representing five digits as indicated along the left edge of FIG. 2, and these digits representing a cents decade 201, a tenths decade 202, a dollars decade 203, a tens decade 204, and a hundreds decade 205. Each such decade includes an outer terminal, such as the terminal 201a comprising a stepping lead which is common to all positions of the decade and advances it one position each time it is pulsed, and an innermost reset termial 201b which is likewise common to all of the positions of the decade and serves to reset the decade to an initial condition each time that the reset 201b is pulsed. To avoid crowding the drawings, the labeling and description of the decade counter 201 is intended to apply equally to all of the other decades illustrated in this manner. The present calculator system includes a full keyboard including at least five columns of keys including a cents column 210, a tenths column 211, a dollars column 212, a tens column 213, and a hundreds column 214. Each of these keys includes a switch arranged to apply a pulse to a single one of the positions of an associated decade counter, and each of the switches is connected to the associated counter through a capacitor such as the capacitor 215 in the cents column and connecting the No. 1 key 210a to the No. 8 position in the cents decade counter 201. The other capacitors located in the column directly above the capacitor 215 serve similar functions, but are not provided with reference numerals.

As stated in the objects of this invention, the present system employs a novel method of transferring numbers back and forth among the registers, and is based on the concept of using the nines complement in at least one of the registers, namely the register A of the present embodiment. This explains why the No. 1 key 210a in the cents digit is connected with the No. 8 position of the decade counter 201. The other keys on the keyboard, including the keys 210, 211, 212, 213 and 214, are all connected in reverse order according to the nines complement with the decade counters to which they are associated so the number entered in the register A is the nines complement of the number pressed on the keyboard by the operator.

In a similar manner, the printer 30 and digital readout indicators 201c to 205c are likewise connected in nines-complementary fashion with the decade counters 201 through 205, inclusive, of the register A. Thus, the 210 key of the keyboard representing one cent actuates the No. 8 position of the decade counter 201, but this No. 8 position is connected by a wire 210b to the numeral 1 digit in the printer 30 and to the numeral 1 digit in the cents indicator 201c. Any suitable type of digital indicator will suffice for these indicators 201c, 202c, 203c, 204c and 205c, as well as for an additional indicator 216 which is connected to indicate a department or account against which the sum displayed on the indicators 201c to 205c is to be entered depending upon which of the account symbol keys in the bank 217 is depressed. These indicators can be any of a number of different commercially available devices, such for example as the Nixie Neon indicators which are very extensively used in electronic calculators at the present time. These indicators generally are required to indicate the particular instantaneous position of the associated decade counter, and adapted to be remotely placed at a location which is convenient both to the operator and to the customer, or several of these indicators can be easily connected to the decade counters to provide several indications at whatever location is desired. The details of these indicators and of the printer are not discussed in detail in the present specification in view of the fact that their particular structure is not considered novel to the present invention.

Since the register A contains the nines complement of any number transferred to or from it, it is not reset to zero when the reset input is actuated in each of the decade counters 201 through 205, but instead is reset to read 99999. The other registers, namely the registers B and C, are wired in such a way that when their reset terminals are actuated, they are reset to zero. A more detailed explanation will appear hereinafter when the program cyce of the system is described in greater detail.

The register B comprising decade counters 301, 302, 303, 304 and 305, and the register C comprising decade counters 311, 312, 313, 314 and 315 (FIG. 3) are arranged so that the lowermost counter of each comprises the cents digit of the register and the uppermost comprises the hundreds digit of the register. It is to be noted that additional digits for the system, representing thousands and ten thousands, can be employed merely by adding additional counters and corresponding keys on the keyboard.

The register A, performing a plurality of functions, accepts from the keyboard the individual item prices, and subtotals and totals transferred back and forth from the other registers during computations; all these entries being entered in the nines complement. It also registers the resultant entry total, the total change due the customer and all other numbers to be printed or indicated on the Nixie indicators in complementary form, because all numbers to be indicated or printed are taken directly from the register A and are converted from the nines complements to appear in true number form when they are printed or indicated. The register B registers the overall subtotal and the total including tax, both in true number form. Finally, the register C keeps track of taxable subtotals, assuming that not all entries are necessarily taxable, and at one stage in the program accepts a total in nines complement form which is subtracted from the cash tendered total in register A, by adding it thereto, for determining change due the customer.

A tax bank is located in a column (FIG. 3) between the registers B and C and has a plurality of gates which are controlled to compute the correct tax, the present example being set up to compute tax, not as a simple percentage of the amount of the bill, but instead in discrete steps which is the most difficult type of tax to compute. Details of this tax computation will be further discussed.

Turning now to a more detailed discussion of the program, commencing with the entry cycle by which numbers are entered into the system by the keys 210 through 214, inclusive, representing a complete 5-digit keyboard.

The three registers A, B and C (FIGS. 2 and 3) are coupled through various gates to a pulse path or highway provided by a wire 450 (FIG. 4) and are selectively interconnected by a tax path or highway provided by a wire 451. Trains of pulses are transferred back and forth among the three registers along these two highways when associated gates are set to permit such a transfer of pulses. The pulse highway 450 connects through a gate 427 into a series of magnetic decade counters 452, 453 and 454 which serve to display the instantaneous counts and to actuate mechanical counters capable of retaining the totals in the event a power failure which might reset the electronic decade counters to zero, thereby causing the loss of the total. This group of magnetic decade counters is illustrated in three digits and comprises the counters 452, 453 and 454, beginning with the least significant digit, this last counter 454 having divided down the input pulse rate sufficiently that the mechanical digital counter 455 can follow the incoming pulse signals. The tax highway 451 feeds through a gate 413 into another bank of magnetic decade counters shown in two digits and including the counters 456 or 457 which in turn operate a mechanical counter 458 which mechanically totals the amount of tax collected on the various bills issued.

*The amount entry cycle*

Assuming that the system has just been turned on or that a previous complete program has been complete, the registers may or may not be cleared depending on the nature of the next preceding function of the system. It is therefore desirable to clear the system completely before beginning with a new program of operation. For this purpose, a system clear key 460 (FIG. 4) is provided for connecting a source of voltage (not shown) through the gate 440 and into a clear and set generator 461 which may comprise any suitable device for delivering a pulse when energized and has means for delivering two different outputs depending on the instantaneous condition of the generator. The upper wire 463 (FIG. 4) leading from the generator and labeled "clear" connects to a wire 363 (FIG. 3) which is connected through a series of coupling diodes 316, 317, 318, 319 and 320 to the innermost terminals of the decade counters in the B register (FIG. 3) to provide a signal resets all five counters 301–305, inclusive, to zero. Also, it will be seen that the clear signal from the clear and set generator 461 goes through a diode 462 in wire 463 and to a wire 263 (FIG. 2) which is connected to the inner reset terminals of all five of the decade counters 201 to 205 in the A register by a series of diodes 218, 219, 220, 221 and 222. Thus, registers A and B are reset and cleared by the generator 461. Moreover, a pulse is supplied by wire 463 connected to the reset terminal 464 of the entry cycle ring counter 10 to set this counter in the No. 1 position, of three possible positions. This same wire also supplies a pulse through the gate 439 to a first entry flipflop 430 so as to restore this flipflop to an initial condition, as will be presently described. The portion of the reset wire 363 (FIG. 3) connected to reset the B register to zero also has a branch also marked 363 which goes to the center terminal of a tax counter decade 321 to be hereinafter explained in greater detail. There are other reset functions performed in this system which will be described as the circuits involved are discussed.

After the system has been cleared resetting registers A and B, as well as the register C in a different manner to be hereinafter explained, the register A then contains 99999 and registers B and C are both reset to zero. At the start of an entry cycle, initiated by pressing keys on the keyboard along the left edge of FIG. 2, both the entry cycle ring counter 10 and the compute and print cycle ring counter 20 are in position No. 1 as marked on the drawings. These are electronic ring counters generally comprising flipflop circuits which are successively stepped each time a common input terminal thereto is pulsed, the input terminal to the counter 10 being labeled 468. These ring counters also have a common reset line by which they can be set to position No. 1. If an entry on the keyboard represents the first entry item on a bill, then the first entry flipflop 430 remains in reset condition as caused by passage of the clear pulse through a gate 439 rendering the right side of the flipflop 430 conductive while its left side is off to prevent the printing of zeros from the register A at the top of the paper tape at the start of the first entry cycle. Assuming that the price of an item is entered at this instant on the keyboard by depressing the appropriate keys, the switches associated with these keys and located immediately thereadjacent are closed. Each closed switch completes a circuit from a corresponding position of one of the decade counters 201–205 to a wire 223 (FIG. 2), connected to a wire 423 (FIG. 4) which is connected to a clear and set generator 465 to be hereinafter described. The keyboard is preferably designed so only one of the keys in each digit is pressed down at any one time, and once pressed it is held down until released by a magnetic release device 466, the timing of the actuation of which will be more fully described hereinafter. Moreover, the keyboard preferably is of the type wherein the depressing of any other key releases the first key to be pressed in the denomination, and the pressing of the zero key releases all of the keys. The information to be entered into the system by the keys is not immediately set into the A register, and until a signal to set this information into the A register is sent from the clear and set generator 465, this information remains recorded by the key positions which may not correspond with the information at that moment contained in the A register and left over from a previous function or transaction. Assuming now that the price has been entered on the keyboard and that the keys are being mechanically held down subject to subsequent magnetic release, the operator then presses an entry key 466 to start a chain of events.

The actuation of the entry key 466 initiates a trigger pulse which is applied from a trigger circuit 465 through a gate 416 to the stepping input terminal 468 of the entry cycle ring 10, thereby stepping this entry cycle ring from position 1 to position 2. Assuming the present entry cycle is not the first, because the information now stored in the keys 210–214 inclusive has not at this point been entered in the register A, the previous entry is thus retained in register A until the present entry is entered and will be continuously displayed to the customer and the operator long enough for them to take note of it. In this condition, when the entry cycle ring 10 moves to position 2 a pulse is sent along the wire 469 and through a gate 401 to a bistable flipflop 470 to control the register A.

Remembering that the A register stores information in complementary form, if the register contains a prior bit of information, it will then read a number less than 99999. Thus, when the flipflop 470 is actuated by a pulse from the gate 401, this flipflop delivers a pulse to a gate 402 thereby rendering this gate conductive to pass a train of 100 kc. pulses from a 100 kc. pulse oscillator 471 through a wire 472 and the gate 402 and through the gate 424. This train of pulses from gate 424 passes through a wire 473 (FIG. 4) connected to a wire 273 (FIG. 2) which feeds into the connection 201a of the decade counter 201 causing this decade counter to step forwardly with each pulse until it reaches the count 9, and at this point a transfer signal is transferred through a wire 201d into the stepping connection of the decade counter 202. When counter 202 has been counted to 9, it issues a carry pulse through a wire 202d and causes the counter 203 to be stepped around one position. Similar carry functions take place through the wires 203d and 204d until all of the decade counters 201 to 205 in the A register have been brought up to 9. This counting of the A register back up to 99999, then, takes a definite number of pulses directly depending upon the nines complement number which was stored in the register A. The group of wires labeled 225 (FIG. 2) are connected at their upper ends respectively with each of the position 9 outputs of each of the decade counters in the A register, and at their other ends to wires 425 which are all connected in the gate 414. This is an "and" gate and becomes conductive when all of the input wires 425 are provided with signals by the five decade counters in the A register being in position 9 simultaneously. When the gate 414 is conductive, it passes a signal to reverse flipflop 470, thereby stopping the flow of pulses to register A through gate 402, and delivers a pulse by a wire 474 through the gates 415 and 416 and steps the entry cycle ring 10 to the next position, namely position 3.

However, more has transpired during the counting of the pulses from the 100 kc. pulse oscillator 471 required to count the register A back up to 99999 again. Each of these pulses from the oscillator 471 to the register A has also been applied by an amplifier 402a to the pulse highway 450 which transmits pulses via a gate 403 enters the gate 404. The entry cycle ring 10 in position 2 has put out an enabling signal along the wire 469 which is passed into the gate 403 and thereby enables this gate, which in turn enables the gate 404. This train of pulses provided by oscillator 471 passes through the gate 405 and the wire 475 (FIG. 4) connected to a wire 375a (FIG. 3) and is applied to the stepping terminal 301a of the decade counter 301 which then counts upwardly from zero or from whatever subtotal is already stored therein. Upon arriving of counter 301 at 9, a carry wire 301c carries a pulse upwardly and steps the decade counter 302 ahead by one position. By continuing this well-known process, a carry pulse is applied on the wire 302c to step the counter 303 ahead by one position, and subsequently the counter 303 can pass a pulse on the wire 303c into the counter 304, which in turn eventually can provide a carry signal on the wire 304c into the last digit of the B register comprising counter 305. Incidentally, register B is cumulative and continues subtotaling all of the entries made in the A register, but the A register is always reset to 99999 at the end of each entry cycle. This same definite number of pulses transferred to the register B along the pulse highway 450 is also transferred by the gate 427 into the magnetic decade counters 452, 453, 454 to be displayed by the lamps connected with these registers and shown adjacent thereto. Also, the total is added up in the mechanical counter 455.

In a similar manner, the pulses being passed along the pulse highway 450 while the register A is being counted up to 99999 can also be entered into the register C through gates 408 and 409 provided the gate 408 is enabled through the gate 407 by the entry of a pulse into a gate 406 from a wire 469 connected with the position 2 terminal of the entry cycle ring 10. However, although all entries are added in the subtotal register B, only certain taxable entries are to be made in the register C, whenever the item is determined by the operator of the machine to be a taxable item. If the operator merely presses the entry button 466, the gate 406 will be blocked by a flipflop 478 which is normally in such a position as to provide a blocking signal to the gate 406 by way of a wire 478a and nothing is entered in the C register. However, if, when making an entry, the operator also presses a tax key 479, thereby indicating the desire to have this entry taxed, an enabling pulse passes along the wire 480 to the gate 410 which then passes a signal through the wire 481 to set the flipflop 478 to be conductive on the righthand side, thereby sending a signal through the wire 478a for rendering the gate 406 conductive to render gate 407 conductive and thereby enable the gate 408, and thus pass said definite number of pulses from the pulse highway 450 through gates 408 and 409 into the wire 482 (FIG. 4) which connects with the wire 382 (FIG. 3) coupled to the stepping connection 311a of the decade counter 311 of the C register. Appropriate carry signal wires 311c, 312c, 313c and 314c transfer the numbers up the register C and enter the same number of pulses in that register which were read out of register A and entered into register B. Thus, if the tax key 479 is pressed, the tax register C also receives the entry from register A, when the entry key 466 is pressed. If the tax key 479 is not pressed, then the items entered in register A are added only to the register B. In this way, it is possible to select whether each item is a taxable item or not, this being especially useful in jurisdictions where certain staple items are tax-free under the law. Later on, when the taxable items are all entered in the register C the tax on that amount is computed in the tax bank 364 and the true tax is emitted to the tax highway 451, whence it is gated to the permanent total tax counter gate 413 in a manner to be described in greater detail hereinafter The end of the adding operation by pulses entered into the register A is signaled when all of these wires 425 are energized, which occurs when all of the decade counters in the A register read 9. As stated above, when this occurs, a signal is conducted through the gate 414 to the flipflop 470 which reverses to block the gate 402. This signal is also sent via the gates 415 and 416 from the wire 474 to step the entry cycle ring 10 to position 3.

Assuming now that position 3 of the entry cycle ring 10 has been activated, a pulse through a wire 484 to the gate 417 is then passed into the clear and set generator 465 so as to "set" this generator and energize wire 423. The pulse transmitted by the wire 423 (FIG. 4) passes into the wire 223 (FIG. 2) and through any of the closed key switches which are associated with depressed keys made during the keyboard entry when the entry cycle ring 10 was in position 1. As stated above, the decade counters in all of the registers are of the type that can be stepped to any position by energizing the associated input to that position, and thus the switches associated with the various keys in effect connect the set wire 423 (223 in FIG. 2) from the generator 465 to the positions of the decade counters in the register A, which become energized according to the depressed keys in the rows of keys 210 through 214, inclusive. Thus, the decade counters in the register A are automatically stepped to new positions. The clear and set generator 465, however, first delivers a pulse along the clear line 486 (FIG. 4) meets the wires 286 (FIG. 2) connected with each of the reset terminals 201b, etc. of the decade counters 201 through 205, and thereby all of the counters in the register A are immediately reset to 99999. Then, after a brief interval caused by a time constant within the generator 465, the generator is set or flops back to the other position and delivers its signal along the set wire 423 to enter the numbers set up on the keyboard, thus setting these numbers from the keyboard into the reigster A. The output set signal from generator 465 is also applied along the wire 423a to the magnetic release 466 which actuates a mechanical device (not shown) releasing all of the depressed keys to ready the keyboard for the next entry of item prices thereinto.

In addition, when the entry cycle ring 10 is stepped to position 3 a print command signal is sent from terminal 3 of the entry ring counter 10 through a gate 419 and a diode, and a wire 487 (FIG. 4) connected to a wire 287 (FIG. 2) and to the printer 30 which is thereby actuated to print the amount thus entered in the register A each time the entry cycle ring 10 moves to position 3. Inasmuch as the printer is a mechanical device and therefore slower than the electronic register, it is unnecessary to provide a delay in the circuit since the entry is made in the register A from the keyboard in a matter of microseconds but on the other hand the printer cannot normally operate in less time than a few milliseconds. When the printer has completed its function, it delivers a print "complete" signal back along the line 288 (FIG. 2) and into the wire 488 (FIG. 4). The print complete signal is passed from line 288 through gates 418 and 416 to ring 10 to step the entry cycle ring back to position 1, and at the same time through gate 418 and a wire 488a to the flipflop 430, thereby resetting this flipflop. As stated above, the flipflop 430 is during the very first entry in a position which differs from its position during other entries, and it is changed from this initial position to the later position by the first pulse delivered to it along the wire 488a. Although subsequent pulses on each entry are delivered along this wire to the flipflop 430, it is not affected thereby because it is already in this position for later entries. At this point, one full entry cycle has been completed from the keyboard into the A register, and the system is ready for the next keyboard entry cycle, beginning all over again with the entry cycle ring counter 10 in position 1.

It is unnecessary to run through this complete cycle since it is the same as the previous cycle except for the fact that the flipflop 430 is now in a different position than it was in initially. In the initial position the printer is disabled so that it will not print zeros, this disabling effect being accomplished by blocking the gate 419 when the left side of the flipflop 430 is conductive.

*Tax calculation circuits*

Referring to FIG. 3 the C register including the decade counters 311–315, inclusive, as stated above, accumulates and totals the taxable entries made in the system whenever the operator presses the tax key 479. The totals of these taxable items are counted in the C register in exactly the same manner as they were entered in the A register except for the fact that the C register enters the totals in true form beginning with an initial reading of 00000, whereas the A register enters the amounts in complement form beginning with an initial reading of 99999.

The tax calculating circuits (FIG. 3) are substantially as disclosed and claimed in copending U.S. patent application of Robert M. Berler, Serial Number 244,068, filed December 12, 1962 entitled "Tax Computation and Billing Systems" and assigned to the same assignee as is the present application. Briefly, such circuits include a printed-circuit tax calculating board 364, and because the amount of the tax is never very large, only the first three counters 311, 312 and 313 of the C register are connected to the printed circuit board 364 because three digits are adequate to register the tax computed within the capability of the machine described in the present example. Board 364 includes three digital columns representing cents in the righthand digit column, tenths in the center digit column, and dollars in the left digit column. The three columns are connected with the successive positions of the decade counters 311, 312 and 313 of the C register. Thus, the particular decimal positions of these three decades which are energized at any particular instant of time likewise energize one of the wires in each of the three vertical digit columns on the printed circuit board 364. These columns of wires on the printed circuit board 364 are further connected to a plurality of 4-leg gates 365 to 378 representing the various tax breaks according to the tax law of a particular community. The present circuit is arranged, as shown, for three initial tax breaks below the item value of $1.00 at $.15, $.39 and $.65. When the item value of $1.00 is exceeded, according to this law the subsequent tax breaks are at $1.00, $1.19, $1.58 and $1.86. When the item amount of $2.00 is exceeded, the tax breaks are at $2.15, $2.43 and $2.72. From this value up, the tax break groups continue to alternately repeat so that the next set of tax breaks would be at $3.00, $3.29, $3.58 and $3.86. Then the $4.00 range of breaks is at $4.15, $4.43 and $4.72. In this manner, the tax breaks alternate up to the maximum item value for which the present illustrative cash register system is designed, namely $999.99, and at this maximum value the maximum tax would be $35.00.

The gates connected to the rows of wires on the printed circuit board 364 include the gates 365, 366 and 367 which represent the tax breaks at $.15, $.39 and $.65, respectively; the gates 368, 369, 370 and 371 which represent the tax breaks at $1.00, $1.19, $1.58 and $1.86, respectively; the gates 372, 373 and 374 which represent the tax breaks at $2.15, $2.43 and $2.72, respectively; and the gates 375, 376, 377 and 378 which represent the tax breaks at $3.00, $3.19, $3.58 and $3.86, respectively. An additional gate (no number) is shown above the gate 378, indicating that this type of system can be extended to cover whatever total amount of tax must be accommodated by the system, which may be made as extensive as desired for any particular cash register.

The tax computing ssytem includes a tax break flipflop 380 of the bistable type and a ring counter 381 having as many rings as are necessary to accommodate the total number of dollars to be entered by the tax register. Since the present example only illustrates one, two, or three dollars, only the first two possible positions of the ring counter 381 are used, and a third blank position is provided to accommodate, if necessary, the $4.00 series of tax breaks. In the reset or initial position of the tax break flipflop 380 the lefthand side, connected by a wire 380a to gates 365 to 371, is activated and activates these gates so that tax breaks between zero and $1.86 can be registered by counting pulses provided through the output diodes 365a through 371a into wire 351 (FIG. 3) which connects with the tax highway 451, in FIG. 4. When the tax break at $1.86 is reached, the output from gate 371 is delivered through a diode 371b to the set terminal of the tax break flipflop 380 causing it to reverse so its lefthand side becomes nonconductive and its righthand side becomes conductive. With flipflop 380 in the set condition, the gates 365 through 371 are blocked and the gates 372 through 374 are enabled to permit the count to continue through these enabled gates until the gate 374 delivers an output representing a count by register C through $2.72. At this point, the output of gate 374 is delivered by way of the diode 374b to a trigger circuit 383 which delivers a pulse to the ring counter 381 activating its No. 2 position and deactivating its No. 1 position and blocking all of the gates 365 through 374 which have inputs connected to the No. 1 position of the ring counter 381. When the No. 2 position of the ring counter 381 is thus activated, the gates 375 through 378 are activated to, as the register C continues to count upwardly, deliver outputs to the output tax line 351 through their output diodes, and thence to the tax highway 451 (FIG. 4) until the uppermost gate 378 becomes activated to deliver a pulse representing $3.86. The output of gate 378 is also passed through a diode 378b to trigger circuit 383 which provides a trigger pulse to step the ring counter 381 to its next position, which as shown, is the position 1 as indicated by the wire 381a. In this manner, the gate circuits taken with the printed circuit board 364 operate together to transfer the proper tax amount from register C to the tax highway 351 in FIG. 3 and 451 in FIG. 4, to be further utilized as will be described in connection with the compute and print cycle ring 20, discussed hereinafter.

One additional feature of the tax computing system is provision by which no tax may be charged below a certain value of purchase, and by which an initial tax is charged when this value is reached. The circuit appears in FIG. 3 and provides an example in which no tax is charged for items below $1.00, but then an initial tax of 4 cents is charged when the value of $1.00 is reached. The outputs of gates 365 to 368 are disconnected from tax highway 351 (not shown) and a diode marked 368c is connected to the output of the gate 368, which is activated at the amount of $1.00, and through a wire 384 to an initial tax flipflop 385 and renders the lower side of this flipflop conductive in response to an output from gate 368 to enable a gate 386 to indicate the face that the taxable subtotal now exceeds $1.00. At the beginning of the subsequent total cycle, namely position No. 3 of the entry cycle ring counter 10, a pulse is delivered from counter 10 along the wire 488 (FIG. 4) to the wire 388 in FIG. 3 which is fed to the gate 386 which when enabled by flipflop 385 passes pulses to the initial tax ring counter 321 from the 100 kc. pulse oscillator 471 by way of the wire 472 (FIG. 4) and the wire 387 in FIG. 3. These pulses from oscillator 471 continue to pass until the ring counter 321 becomes activated in position 4 which has been preselected and connected to a wire 386 to the initial tax flipflop 385 and shuts off this flipflop, thus blocking the gate 386 to prevent further passage of pulses into the counter 321. At this point, a total of 4 pulses has been counted into the initial tax ring counter 321, and were simultaneously delivered by way of diode 321a to the tax highway 451 (FIG. 4) by way of the wire 351 (FIG. 3). The 4-cents initial tax was preselected by connecting the No. 4 outlet of the ring counter 321 to the wire 386a, however, according to the circuit illustrated in FIG. 3 to connect any other preselected initial tax up to and including 10 cents is accomplished by merely moving the connection leading from the counter 321 to the wire 386a.

The manner in which this tax-computing circuitry cooperates with the program of the register system will become apparent hereinafter.

*Compute and print cycle program*

Individual billing amounts are entered in registers A and B in the manner described in connection with the programming of the entry cycle ring 10, this ring going through all three positions to complete a full cycle for each item entered. The A register receives and contains only the amount of a single entry during each cycle and is reset for the next entry, but register B is not reset between cycles of the entry cycle ring 10 and it continues to accumulate the individual amounts entered on the keyboard 210–214 as these items are set into the A register.

It is the function of the compute and print cycle ring counter 20 (FIG. 4) to carry forward the program of the system from the moment when the total button 489 is pressed by the operator to indicate that all of the amounts have been entered on the keyboard and set into the register C. It will be recalled that when the clear key 460 is initially pressed to clear the machine, the compute and print cycle ring 20 was set in the position 1, and it has remained in this position which involves no output therefrom during all previously described functions of the entry cycle ring 10.

The portion of the program which is carried on by the compute and print cycle ring 20 is started when a total key 489 is pressed indicating that all of the amount entries have been made. The pressing of key 489 simultaneously steps both the entry cycle ring counter 10 and the compute and print cycle ring counter 20 into position 2 by delivering an output pulse from the trigger 490 to the stepping gate 416 of the ring 10 and also through the diode 491 to a wire 492 which is the stepping input to the compute and print cycle ring 20, this ring 20 being advanced one position each time the wire 492 provides a pulse. It is necessary to also step the entry cycle ring 10 to position 2 because the last entry made on the keyboard 210–214 has not yet been set into the A register, and therefore the entry cycle must be performed once again to enter the last keyboard entry into the A register and to then clear the keyboard. The entry cycle ring 10 proceeds once more through its program and enters the final entry as previously described by enabling the gate 401 which in turn drives the flipflop 470 to its set position to enable the gate 402 to pass a train of pulses from the 100 kc. oscillator 471 by wire 472, through the gate 424 and drive the ring counters in the A register until one by one all of the decade counters in the register A have been counted back up to position 9, at which time a pulse is delivered through gate 415 to reset the flipflop 470 to its inactive position and block the gate 402. The pulses which are required for the purpose of counting the decade counters in register A back up to the number 99999 are also delivered through amplifier 402a to the pulse highway 450 and into the register B through gates 404 and 405 and along the input wires 475 and 375 in the manner previously described. When the entry cycle ring 10 reaches position 3, and when the print step in this position has been completed and a complete signal has been returned along the wires 288 and 488 to step the entry cycle ring 3 back to the No. 1 position, the gate 420 which is connected with the No. 2 position of the compute and print cycle ring counter 20 is also enabled by a pulse delivered from the No. 3 position of the entry cycle ring 10 to the gate 420, thereby causing the output from position 2 of the ring 20 to pass through wire 492 and thereby pulse the compute and print cycle ring 20 to advance to position 3 at the same time that the entry cycle ring 10 resets itself to position 1, in which position it remains for the duration of the program. The last entry of the keyboard 210–214 has in this way been entered in registers A and B.

At this instant when the compute and print cycle ring 20 is advanced to position 3, the A register still contains the information entered therein from the last entry on the keyboard 210–214, and it is therefore desirable that this information which has now been entered in the register B, and in the register C if the tax key 479 was depressed, be cleared from the register A. In position 3 of the ring 20, a pulse is delivered from the terminal 3 through a wire 493 to a clear and set generator 494 which provides a pulse through the wire 463 (FIG. 4) to the wire 263 in FIG. 2 which is connected by diodes 218, 219, 220, 221 and 222 to the reset terminals of the decade counters 201 through 205, respectively, to reset these counters so register A is at 99999.

When the pulse along the line 263 dissipates, the clear and set generator 494 reverts back to a set position and delivers another pulse through the wire 495 (FIG. 4) to the wire 295 in FIG. 2, and diodes 226, 227, 228, 229 and 230 for the purpose of setting the register A to the complement of the maximum tax which could be entered therein by the present system. Since this cash register can accommodate only sums up to $999.99, this maximum tax is $35.00 and its complement in register A would read $964.99. The diodes by which this maximum entry is made into the register A from the generator 494 can be suitably mounted on a printed circuit board which is easily changeable to accommodate changes or differences in tax rates. The same pulse that sets the complement $964.99 of $35.00 into the register A also steps the compute and print cycle ring 20 to position No. 4 by way of the wire 496.

In position 4 of the compute and print cycle ring 20 the complement of the tax accumulated in register C is entered into register A by a process which involves counting register C up to 99999. The register C up to now has contained the subtotal of taxes on all the taxable entries made on the keyboard 210–214, thus the count up of register C to 99999 provides to the tax highway 451 the difference between the maximum tax of $35.00 which has already been entered in complementary form in the A register and the tax subtotaled in the C register.

This is accomplished by sending a pulse from the No. 4 terminal of the compute and print cycle ring 20 along the wire 497 to a gate 421 to enable this gate to pass a pulse therethrough to a flipflop 498 which controls the C register. The pulse from the gate 421 renders the left side of the flipflop 498 conductive, which in turn enables a gate 422 to pass pulses from the 100 kc. pulse oscillator 471 which gate 422 receives through the wire 472. Such pulses passed by gate 422 are then passed through a gate 409 to a wire 482 (FIG. 4) and a wire 382 (FIG. 3) into the stepping terminal 311a of the decade counter 311 in the C register. At the same time, pulses coming from the gate 422 also travel through an amplifier 522 onto the main pulse highway 450 and from there travel in the direction of the reigster A. The No. 9 terminals of each of the decade counters in the register C are connected directly with a gate 335 and when all of the decade counters in the C register reach 9 simultaneously, the gate 335 is actuated to deliver an output through wires 336 and 499 into the flipflop 498 which resets flipflop 498 and blocks gate 422 from passage of further pulses. Thus, the C register has now been counted to 99999 and stops.

As set forth above in connection with tax computing, when register C is counted upwardly, the various conductors of the printed circuitboard 364 become energized as the associated positions of the decade counters to which they are attached are energized to provide a train of pulses through the tax gates 365–378 as these individual gates were rendered conductive one at a time. When these gates are conductive, they deliver output pulses through associated output diodes to an output wire 351 (FIG. 3) which connects with a wire 451 in FIG. 4, which is a tax highway. Thus, at the various intervals when the gates 365 through 378 become conductive, the pulses from these gates are entered through the gate 441 and through the gate 424 into the input line 473 (FIG. 4) to the register A, this input line connecting with the wire 273 (FIG. 2), which in turn connects to the input terminal of the first decade counter 201 so as to step this counter one position for each output pulse from the tax bank. In this manner, the actual tax value is entered and added in complementary form to the maximum tax value representing $35.00. Since the tax pulses are added so as to count the register A in the direction of the numeral 99999, the tax value is actually subtracted from the $35.00 on the register thereby returning this value toward the nines complement of 00000, namely 99999. This entering process continues in the register A until the register C has been counted to 99999. When this occurs, the outputs from the several No. 9 positions of the individual decade counters in the register C send their individual pulses to the gate 335 which then passes an output to the wire 336 which connects with the wire 499 and resets the flipflop 498 to the "off" position, thereby blocking the gate 422 and preventing entries of further pulses into the C register. The wire 499 also connects with a diode 500 which couples the output pulse from the gate 335 to the wire 492 connected with the stepping terminal on the compute and print cycle ring 20. In this manner, the ring is stepped to position 5 when the correct tax appears in complement form in the register A and the register B still shows the overall subtotal of all entries (not including tax) made on the keyboard 210–214. At position 5, the compute and print cycle ring 20 sends out a pulse to enable the gate 428, which pulse is also coupled to a diode 501 which is in turn connected with the wire 487 traveling to the wire 287 and the printer 30 in FIG. 2. Thus, the printer 30 is caused to print in true form the complement entry representing total tax in the register A, and after printing to return a complete signal along wire 288 and wire 488 which signal is applied to the gate 428 and passes upwardly therethrough to the diode 502 and on to the wire 492 to advance the compute and print cycle ring 20 to position 6. Also, part of the print pulse from the No. 5 position of the compute and print cycle ring 20 passes through the wire 503 and the bundle of wires 203 to the top input to the printer 30 which prints a symbol alongside the tax entry indicating that it is a tax entry. Finally, part of the output of the terminal 5 of the ring 20 travels through the wire 504 and wire 394 to the tax break flipflop 380 to set this flip-flop conductive on the left side where it remains until the taxing cycle begins all over again.

In the No. 6 position of the compute and print cycle ring 20, the tax in register A in complement form is added to the subtotal of all entries made in the register B to produce the total in true form comprising both the total entries in register B and the total tax. When a nines complementary entry in register A is transferred, it is received in true form in register B. In position 6 of the compute and print cycle ring 20, a pulse is sent along the wire 505 and enables the gates 403 and 426 so as to open the gates 404 and 427 to pulses. Moreover, the pulse from the No. 6 terminal enables the gate 401 to actuate the flipflop 470 which in turn enables the gate 402 to pass pulses from the generator 471 and the wire 472 through the gate 424 and into the wire 473 which is connected by wire 273 with the A register input terminal 201a to begin stepping the register upwardly from 99999. The pulses passing to this register from gate 402 also pass through the amplifier 402a into the pulse highway 450 and along this pulse highway through the gates 404, 405, into the wire 475 and the wire 375a into the B register stepping terminal 301a whereby the number of pulses counted by the A register is also entered in the B register to bring the total thereof from the subtotal of the entires by the keyboard to the subtotal of these entries plus the tax, thereby computing the grand total of the customer's bill. When the register A has been brought up to 99999, the wires 225 and 425 bring this information to the gate 414 which then passes a signal to reset the flipflop 470 and turn off the gate 402, while at the same time delivering a pulse through the wire 474 across to the gate 429 and through a diode onto the stepping wire 492, which then steps the counter 20 to the next position, position 7. At the same time highway 450 provided a pulse to gates 404 and 405, it also provided a pulse to the gate 427 which has been enabled by the gate 426 in position 6 of the programmer 20, so that the tax being entered in register B is also entered into the total register means 452, 453 and 454 and added into the mechanical register 455.

On compute and print cycle No. 7, the total in the register B in true form and representing all entries on the keyboard 210–214 as well as the tax, is transferred in complement form to register A for printing and to register C for purposes of calculating the change. In position 7 of the compute and print cycle 20, a pulse is sent from position 7 along the wire 506 to a one-shot signal generator 507 which passes a pulse through the gate 424 along the wire 473 into the wire 273 and drives the register A forwardly by one step from 99999 to 00000. Also, the pulse is sent through a delay line 514 to fire the flipflop 508 for enabling gate 449 to pass pulses from the wire 472 and the 100 kc. pulse oscillator 471 to the gate 405 through the wire 475, the wire 375a and into the stepping terminal 301a of the B register. The admission of these pulses to the B register commences this register counting upwardly until it reaches 99999 at which time the wires 395 which feed into the gate 432 by way of wires 509 pass a signal into the flipflop 508 and shut it off, thereby blocking the gate 449. In the meanwhile, the same train of pulses required to count the register B up to 99999 is also counted through amplifier 510 into the main pulse highway 450 and through the gate 431 which has been enabled by the gate 430 receiving a pulse along the wire 506 from the No. 7 position of the compute and print cycle ring 20. This train of pulses is then applied through the gate 424 and through the input wires 473 and 273 to the stepping terminal 201a to begin register A counting upwardly from 00000 to read the grand total. Since this grand total was in the register B in true form and was counted up to 99999, that the resulting count into the register A will be in complement form, and suitable for direct printing. When the B register has been counted to 99999 the output pulse from the gate 432 will pass through the diode 511 and into the wire 492 which then steps the compute and print cycle ring 20 to position 8. One other function is performed in position 7, namely a pulse is transferred by wire 506 into the clear and set generator 512 which produces an output that is applied along the wire 513 and along the wire 396 through five diodes such as the diode 397 into the reset terminal 311b of the first decade counter in the register C, and in like manner into all of the other decade counters in this register. This clearing process which resets the register C to zero is done before the pulses from the register B are permitted to flow for counting the register B up to 99999 and entering in the register A. This is the reason for the delay line 514 coupled between the output of terminal 7 of the compute and print cycle programmer 20 and the flipflop 508. Thus, in the correct sequence of events the decade counters of the A register are set to 00000 in position 7 by a one-shot pulse from the one-shot generator 507 and the register C is set to 00000 by the output from the clear and set generator 512, and then, after the delay imposed by the circuit 514, the flipflop 508 is turned on and the pulses are permitted to flow to the B register through the gate 449 and to the A register through the gate 431 and the C register through the gate 408 until the B register is counted up to 99999. At this point register B contains 99999, register A contains the grand total in complement form, and register C also contains the grand total in complement form, both of these grand totals having been entered therein while counting the register B up to 99999.

When the pulse from the gate 432 has stepped the compute and print cycle ring 20 to position 8, the output from position 8 passes through a diode and wire 487 into wire 287 and actuates the print function of the printer 30 which then prints the grand total. At the same time a signal is sent to the printer 30 along the wire 516 to place a grand total symbol next to the grand total item printed. The printer 30 does not have a path for sending back a complete signal to the compute and print cycle ring 20 in position 8 and so the cycle does not automatically advance.

The circuit remains dormant and waits until the cash tendered is entered on the keyboard 210–214. At this point, the grand total still appears in the register A in complement form, and when the cash tendered has been entered in the keyboard, the change key 517 is pressed which actuates the trigger 518 and sends a suitable pulse to the clear and set generator 465 which sends a clear signal along wire 486 and wire 286 to clear register A. Thereafter, the clear and set generator 465 delivers a set pulse upwardly through wire 423 which passes through whichever ones of the switches associated with the keyboard 210–214 are closed to set into the decade counters of the register A the amount of money tendered. In addition, the pressing of the change key 517 also couples the output pulse of the trigger 518 into the line 519 and through the gate 433 and a diode into the line 492 which advances the compute and print cycle ring 20 to position 9.

In compute and print cycle position 9, the cash amount tendered set into the register A is printed by the output signal from position 9 through a diode into the print command wire 487 and wire 287 into the printer 30. When the printer has printed the amount of cash tendered, and also a symbol indicating "cash tendered" in response to a signal from wire 520, the printer sends back a complete signal along the wire 288 and the wire 488 which signal passes upwardly through the gate 434 and through a diode into the wire 492 to advance the compute and print cycle ring 20 to position 10. At this point, the register A contains a complement number less than 99999 by the amount of the cash tendered, and the register C contains the complement of a smaller number comprising the number 99999 minus the total amount of the bill. In saying that the amount of register C is less than the amount in register A, it is meant that the true number which the complement represents in each register is smaller in the register C than in the register A. If, then, the complement in register C is added to the complement in register A, the register A will be counted upwardly toward the number 99999 but short of that number by the difference between the grand total and the cash tendered, and this difference represents in register A the change due in complement form.

This, in effect, is a subtraction operation and is accomplished by a pulse from position 10 of the compute and print cycle ring 20 to the wire 521, and through the gate 421 to set the flipflop 498 so as to provide an output to enable the gate 422, thereby permitting pulses from the 100 kc. pulse oscillator 471 through the wire 472 to pass through the gate 422 to the wire 482 and the wire 382 into the stepping terminal 311*a* of the register C. These pulses then begin counting the register C toward 99999 while at the same time the pulses from the gate 422 are passed through the amplifier 522 to the pulse highway 450 and through the gate 431 and the gate 424 to wires 473 and 273 and into the stepping terminal 201*a* of the decade counter 201 in register A. Thus, register A is also started counting upwardly toward 99999, but since it takes fewer pulses to count register C to 99999, register A will still retain the change due when register C reaches 99999 and the gate 335 sends a pulse from the wire 336 and the wire 499 to turn off the flipflop 498 and stop the entry of pulses through the gate 422. When this happens, a pulse is also sent through the wire 499 into the gate 436 and through a diode into the wire 472 to step the compute and print cycle ring 20 up to position 11. At this time, the register C reads 99999 and the register A reads the amount of the change due. It is assumed that in each case, the cash tendered will exceed the total bill so that there is an amount of change due. If not, however, a nonsense answer appears because the register A is counted beyond 99999 and thereby has a low number greater than zero and equal to the change actually due minus one. The display, however, would be in complement form and therefore would appear as a large and obvious mistake.

In position 11 the compute and print cycle ring 20 puts out a signal through a diode into the wire 487 which is coupled to the printer 30 by way of wire 287 and initiates the printer 30 to print the amount of change due, and then send back a complete signal along wires 288, 488 and through gate 437 and a diode into the wire 492 which then advances the compute and print cycle 20 to the last position, namely position 12. Incidentally, the output in position 11 is also sent through a wire 523 to the printer 30, causing it to print a change due symbol next to the printed amount.

On compute and print cycle 12, a signal is emitted from counter 20 along the wire 524 and wire 224 to printer 30 causing it to print "thank you" and to then run the paper out sufficiently far so that it can be torn off. At the same time printer 30 prints the heading for the next bill and, upon completion, sends back a "complete signal along the wires 288 and 488 and then upwardly through the gate 438 and a diode to the wire 492 which steps the compute and print signal ring 20 back to position 1 where it remains. Simultaneously, another signal is sent from position 12 through the wire 525 and the gate 440 to the clear and set generator 461 and along the clear wire 463 therefrom to the wire 363 of the register B which resets all of the counters in the register B to zero through the diodes 316–320, inclusive, and also resets the initial tax ring 321 through the wire 363. Moreover, the output pulse from position 12 travels through the wire 524 to the clear and set generator 512 and resets the C register to zero through the diodes 397, etc. The complement of the change due remains in the A register until cleared by the operation of the clear key 460 before the beginning of the next customer's bill calculation.

I do not limit my invention to the exact system illustrated in the figures of the drawing, for obviously changes can be made within the scope of the following claims.

I claim:

1. A registering and computing system comprising a first plural-digit decade-position counter having a stepping terminal for advancing the counter; keyboard means including a decade group of keys corresponding with each digit of the counter and the keys being connected to positions of the associated counter digits in such a sequence as to set into each digit of the counter the nines complement of a true numeral entered in the group of keys corresponding with that digit; a source of pulses; gate means coupled from said source to said counter-stepping terminal for selectively applying pulses thereto; gate control means coupled to the ninth position in each digit of the counter and operative when the counter reads 9 in all digits to block the gate; sequential entry cycle means including means for energizing the keyboard means to set a number entered thereon in true form into the counter in nines-complement form and including means for enabling the gate means to apply pulses to the counterstepping terminal to count the counter up to read 9 in all digits; and cumulative second counter means connected with said gate means for counting the total number of pulses applied thereby to the first counter stepping terminal on successive cycles thereof.

2. In a system as set forth in claim 1, said keyboard means comprising a switch connecting each key to a digital position and the switches all being connected to a common control bus, and said means for energizing the keyboard means comprising set-generator means having a set-output connected to energize said control bus.

3. In a system as set forth in claim 2, said entry cycle means comprising a ring counter to perform one complete cycle each time a number entry is made on the keyboard.

4. In a system as set forth in claim 1, the keys of said keyboard normally retaining the numbers entered thereinto; keyboard release means; and said entry cycle means including means for actuating said release means after the keyboard means has been energized.

5. A registering and computing system comprising first and second plural-digit decade-position counters each having a stepping terminal for advancing the counter; keyboard means including a decade group of keys corresponding with each digit of the first counter and the keys being connected to positions of the associated counter digits in such a sequence as to set into each digit of the counter the nines complement of a true number entered into the group of keys corresponding with that digit; a source of pulses; gate means coupled from said source to the respective stepping terminals of each of the counters for selectively applying pulses thereto; gate control means respectively coupled to the ninth positions in each digit of the associated counters and actuated when a couner reads 9 in all digits to block the gate means applying pulses thereto; entry cycle means including means for energizing the keyboard means when a number is entered thereon in true form to set the number into the first counter in nines complement form and including means for enabling the gate means to apply pulses to the stepping terminals of both counters to count the first counter up to read 9 in each digit and thereby actuate the gate control means; compute cycle program means operative when all of the numbers have been entered in the counters and including means for setting the first counter to zero in every digit and means for subsequently enabling said gate means to apply pulses to both counters to count the second counter up to read 9 in every digit thereby entering the true total from the second counter into the first counter in complement form and actuating said gate control means; and plural-digit readout means having in each digit a decade of indicators coupled with the decade positions of the first counter in such a sequence as to indicate in each digit a true number corresponding with the nines complement number entered in that digit of the first counter.

6. In a system as set forth in claim 5, said keyboard means comprising a switch connecting each key to a digital position and the switches all being connected to a common control bus, and said means for energizing the keyboard means comprising set-generator means having a set-output connected to energize said control bus.

7. In a system as set forth in claim 6, said entry cycle means comprising a ring counter to perform one complete cycle each time a number entry is made on the keyboard, and including means for enabling said compute cycle means at the end of said entry cycle.

8. In a system as set forth in claim 5, system-clearing means including means connected with the counters to clear them at the beginning of a new cycle of the entire system, said readout means including printer means connected to the first counter and printing the contents thereof after each number entry cycle, and first entry flip-flop means having one condition connected to block the printer and prevent the printing of zeros before a number has been set into the first counter, the flip-flop being actuated by said system clearing means to said one condition, and to the opposite condition by the entry cycle means on its first cycle.

9. In a system as set forth in claim 8, said keyboard means including symbol keys connected to the printer means for printing a symbol indicating an account to which the associated number is chargeable, and said printer having a total symbol connected to the compute cycle means and actuated thereby during the corresponding cycle of the system.

10. In a system as set forth in claim 5, said system including a system-clearing switch connected with the cycle means and with the counters to reset them to a cleared initial condition, a system entry switch connected to the entry cycle means to initiate its function each time a number is entered on the keyboard means, and a total switch connected to the compute cycle means to initiate its totaling function when all numbers have been entered.

11. A cash registering and computing system comprising first, second and third counters each having plural decimal-position digits and each having a stepping input terminal; keyboard means connected with the positions of the first counter in such a succession that numbers entered on the keyboard means in true form are set into the first counter in nines complement form when the keyborad means is energized; a source of pulses; gate means for selectively applying pulses from the source to the counters when enabled and including gate blocking means coupled with each counter for blocking the associated gate means when that counter reads 9 in all digits; entry cycle means for energizing the keyboard means when a number is entered therein to set that number into the first counter and including means for enabling the gate means to apply pulses in sufficient quantity to count the first counter up to read 9 in all digits to apply the same number of pulses to the second and third counters; sequentially functioning compute cycle program means including means for setting the digits of the first counter to read the nines complement of the tax on the highest number which the third counter is capable of registering, and including means for enabling the gate means to apply pulses to the third counter to count it up to read nine in all digits; a tax computing circuit connected with the third counter and delivering pulses in proportion to a preset tax schedule when pulses are applied to the third counter; and said compute cycle program means further including means for connecting the tax computing circuit to the stepping terminal of the first counter to step it up from the complement of said maximum tax toward a reading of nine in all digits, and including means for subsequently enabling the gate means to apply pulses to count the first counter up to read 9 in all digits while applying the same number of pulses in the second register to bring it up to read in true form the total of the entries plus tax, and including means for setting the third register to read zero in all digits, and including means for enabling the gate means to count the second counter up to read 9 in all digits while applying the same number of pulses to the third counter so that it reads in complement form the total of the entries plus tax; means for setting into the first counter in complement form the amount of cash tendered when entered on the keyboard means; and said compute cycle program means further including means for enabling the gate means to apply to the third counter the number of pulses necessary to count it up to read 9 in all digits and to apply the same number of pulses to the first counter; and readout means connected to the first counter to indicate in true form the numbers contained therein in complement form after each functioning of the entry and compute cycles.

12. In a system as set forth in claim 11, said keyboard means comprising a switch connecting each key to a digital position and the switches all being connected to a common control bus, and said means for energizing the keyboard means comprising set-generator means having a set-output connected to energize said control bus.

13. In a system as set forth in claim 12, said entry cycle means comprising a ring counter to perform one complete cycle each time a number entry is made on the keyboard, and including means for enabling said compute cycle means at the end of said entry cycle.

14. In a system as set forth in claim 11, system-clearing means including means connected with the counters to clear them at the beginning of a new cycle of the entire system, said readout means including printer means connected to the first counter and printing the contents thereof after each number entry cycle, and first entry flipflop means having one condition connected to block the printer and prevent the printing of zeroes before a number has been set into the first counter, the flip-flop being actuated by said system clearing means to said one condition, ,and to the opposite condition by the entry cycle means on its first cycle.

15. In a system as set forth in claim 14, said keyboard means including symbol keys connected to the printer means for printing a symbol indicating an account to which the associated number is chargeable, and said printer having tax, total and change symbols connected to the compute cycle means and actuated thereby during the corresponding cycle of the system.

16. In a system as set forth in claim 11, the keys of said keyboard normally retaining the numbers entered thereinto; keyboard release means; and said entry cycle means including means for actuating said release means after the keyboard means has been energized.

17. In a system as set forth in claim 11, said system including a system-clearing switch connected with the cycle means and with the counters to reset them to a cleared initial condition, a system entry switch connected to the entry cycle means to initiate its function each time a number is entered on the keyboard means, a total switch connected to the compute cycle means to initiate its totaling function when all numbers have been entered and a change switch connected to the compute cycle means to initiate its change computing function after the cash tendered has been entered on the keyboard means.

18. In a system as set forth in claim 17, said system having a tax switch; and a gate operative to normally block the flow of pulses to the third counter while counting the first counter up to read 9 in all digits after each number is entered on the keyboard means, the tax switch being connected to render said gate conductive when actuated so that only selected ones of said numbers representing taxable items are entered in the third counter.

19. In a system as set forth in claim 11, accumulating register means operative over a plurality of separate operations of the system and including a total register connected to the compute cycle means and enabled thereby to totalize the numbers entered on the keyboard means, and a tax register connected to the compute cycle means and enabled thereby to totalize the tax amounts computed by the system.

20. A cash registering and computing system comprising first and second and third plural-digit decade-position counters, each having a stepping terminal for advancing the counter; keyboard means including a decade group of keys corresponding with each digit of the first counter and the keys being connected to positions of the associated counter digits in such a sequence as to set into each digit of the counter the nines complement of a true number entered into the group of keys corresponding with that digit; a source of pulses; gate means coupled from said source to the respective stepping terminals of each of the counters for selectively applying pulses thereto; gate control means respectively coupled to the ninth position in each digit of the associated counters and actuated when a counter reads 9 in all digits to block the gate means applying pulses thereto; entry cycle means including means for energizing the keyboard means when a number is entered thereon in true form to set the number into the first counter in complement form and including means for enabling the gate means to apply enough pulses to the stepping terminals of the counters to count the first counter up to read 9 in each digit and thereby actuate the gate control means, the second and third counters accumulating the pulses applied to the first counter on number entry cycles thereof; a tax-computing circuit connected with the third counter and delivering pulses in proportion to a preset tax schedule when pulsed by the third counter; compute cycle program means operative when all of the numbers have been entered in the counters and including means for setting the first counter to read the nines complement of the tax on the maximum amount that the third counter could accumulate, and including means for connecting the tax-computing circuit to the first counter and subsequently enabling said gate means to apply pulses to the third counter to count it up to read 9 in every digit and thereby actuate the tax-computing circuit to deliver pulses to the first counter, thereby adding into the first counter in complement form the difference between said maximum tax and the tax actually due to the amount in the third register, and said compute cycle means including means for enabling the gate means to apply pulses to the first and second counters to count the first register back up to read nine in every digit and thereby actuate the gate control means whereby the tax amount is added to the second counter which then reads the grand total including tax.

21. In a system as set forth in claim 20, said system having a tax switch; and a gate operative to normally block the flow of pulses to the third counter while counting the first counter up to read 9 in all digits after each number is entered on the keyboard means, the tax switch being connected to render said gate conductive when actuated so that only selected ones of said numbers representing taxable items are entered in the third counter.

22. In a system as set forth in claim 20, accumulating register means operative over a plurality of separate operations of the system and including a total register connected to the compute cycle means and enabled thereby to totalize the numbers entered on the keyboard means, and a tax register connected to the compute cycle means and enabled thereby to totalize the tax amounts computed by the system.

23. A cash registering and computing system comprising first, second and third plural-digit decade-position counters each having a stepping terminal for advancing the counter; keyboard means including a decade group of keys corresponding with each digit of the first counter and the keys being connected to positions of the associated counter digits in such a sequence as to set into each digit of the counter the nines complement of a true number entered into the group of keys corresponding with that digit; a source of pulses; gate means coupled from said source to the respective stepping terminals of each of the counters for selectively applying pulses thereto; gate control means respectively coupled to the ninth position in each digit of the associated counters and actuated when a counter reads 9 in all digits to block the gate means; entry cycle means including means for energizing the keyboard means when a number is entered thereon in true form to set the number into the first; counter in nines complement form and including means for enabling the gate means to apply pulses to the stepping terminals of the counters to count the first counter up to read 9 in each digit and thereby actuate the gate control means, the second counter accumulating the total number of pulses applied to the first counter on successive entry cycles; compute cycle program means operative when all of the numbers have been entered in the first and second counters, said compute cycle means including means for setting the third counter to read zero in every digit and including means for enabling said gate means to apply pulses to the second and third counters to count the second counter up to read nine in every digit and thereby actuate the gate control means, thereby entering the true total from the second counter into the third counter in complement form; means for setting into the first counter in complement form the amount of money tendered when entered on the keyboard means in true form; and said compute cycle means further including means for enabling said gate means to apply pulses to the third counter and the first counter to count the former up to read 9 in every digit and thereby actuate the gate control means, thus entering the change due in the first counter in complement form; and readout means coupled to the decade positions of the first counter and displaying in true form the numbers contained in the first counter in complement form.

24. In a system as set forth in claim 23, said system including a system-clearing switch connected with the cycle means and with the counters to reset them to a cleared initial condition, a system-entry switch connected to the entry cycle means to initiate its function each time a number is entered on the keyboard means, a total switch connected to the compute cycle means to initiate its totaling function when all numbers have been entered, and a change switch connected to the compute cycle means to initiate its change computing function after the cash tendered has been entered on the keyboard means.

References Cited by the Examiner

UNITED STATES PATENTS

| | | | |
|---|---|---|---|
| 2,528,100 | 10/1950 | Williams | 235—61 |
| 3,043,508 | 7/1962 | Wright | 235—151 |
| 3,047,227 | 7/1962 | Thomas et al. | 235—153 |
| 3,053,449 | 9/1962 | Hoberg et al. | 235—157 |
| 3,155,822 | 11/1964 | Chiang | 235—173 |

ROBERT C. BAILEY, *Primary Examiner.*

I. S. KAVRUKOV, *Assistant Examiner.*